(12) United States Patent
Olguín

(10) Patent No.: US 11,661,917 B2
(45) Date of Patent: May 30, 2023

(54) OMNIDIRECTIONAL GENERATOR APPARATUS

(71) Applicant: O-INNOVATIONS LTD., Lancaster (GB)

(72) Inventor: Nicolás Gonzalo Orellana Olguín, Viña del Mar (CL)

(73) Assignee: O-INNOVATIONS LTD., Lancaster (GB)

( * ) Notice: Subject to any disclaimer, the term of this patent is extended or adjusted under 35 U.S.C. 154(b) by 0 days.

(21) Appl. No.: 17/273,077

(22) PCT Filed: Aug. 12, 2019

(86) PCT No.: PCT/CL2019/050071
§ 371 (c)(1),
(2) Date: Mar. 3, 2021

(87) PCT Pub. No.: WO2020/047685
PCT Pub. Date: Mar. 12, 2020

(65) Prior Publication Data
US 2021/0340950 A1    Nov. 4, 2021

(30) Foreign Application Priority Data

Sep. 4, 2018   (CL) .................................. 2529-2018

(51) Int. Cl.
*F03D 5/00*     (2006.01)
*F03D 1/00*     (2006.01)
*F03D 3/00*     (2006.01)

(52) U.S. Cl.
CPC ................. *F03D 5/00* (2013.01); *F03D 1/00* (2013.01); *F03D 3/00* (2013.01);
(Continued)

(58) Field of Classification Search
CPC . F03D 5/00; F03D 1/00; F03D 1/0625; F03D 1/02; F03D 1/04; F03D 1/0608;
(Continued)

(56) References Cited

U.S. PATENT DOCUMENTS 1,379,439 A * 5/1921 Bott ...................... A63H 33/40
                                                   416/227 R
1,830,985 A * 11/1931 Dreier .................. F03B 17/061
                                                   416/234
(Continued)

FOREIGN PATENT DOCUMENTS

BE   1020627 A4     2/2014
CN   2921349 Y  *  7/2007
(Continued)

OTHER PUBLICATIONS

Fu CN_2921349_Y_I English Machine Translation (2006) (Year: 2006).*
(Continued)

*Primary Examiner* — David E Sosnowski
*Assistant Examiner* — Wayne A Lambert
(74) *Attorney, Agent, or Firm* — Michael Best & Friedrich LLP

(57) ABSTRACT

It is about an omnidirectional generator apparatus, capable of translating the push of a fluid from any direction in the vertical, horizontal or diagonal plains to rotational movement on a unique axis. This rotational movement can be translated to electric energy by known means.

13 Claims, 5 Drawing Sheets

(52) U.S. Cl.
CPC ..... *F05B 2220/706* (2013.01); *F05B 2250/11* (2013.01); *F05B 2250/70* (2013.01)

(58) Field of Classification Search
CPC . F03D 3/00; F03D 3/061; F03D 3/062; F03D 9/25; F03D 3/02; F03D 3/04; F05B 2220/706; F05B 2250/11; F05B 2250/70; F05B 2240/211; F05B 2240/221; Y02E 10/70; Y02E 10/72; Y02E 10/74
See application file for complete search history.

(56) References Cited

U.S. PATENT DOCUMENTS

| | | | | |
|---|---|---|---|---|
| 3,941,504 | A * | 3/1976 | Snarbach | F03D 3/065 416/197 A |
| 4,012,163 | A * | 3/1977 | Baumgartner | F03D 3/065 180/2.2 |
| 4,115,032 | A * | 9/1978 | Lange | F03D 3/065 416/197 A |
| 4,209,281 | A * | 6/1980 | Edmunds | F03D 3/065 416/197 A |
| 4,234,289 | A * | 11/1980 | Lebost | F03D 3/0481 415/4.4 |
| 4,295,783 | A * | 10/1981 | Lebost | F03B 13/145 415/4.4 |
| 4,365,929 | A * | 12/1982 | Retz | F03D 13/20 416/197 A |
| 4,508,973 | A | 4/1985 | Payne | |
| 4,915,580 | A * | 4/1990 | Obidniak | F03D 1/00 415/908 |
| 5,044,878 | A * | 9/1991 | Wilhelm | F03D 3/061 415/4.2 |
| 5,133,637 | A * | 7/1992 | Wadsworth | F03D 80/70 415/4.4 |
| 5,246,342 | A * | 9/1993 | Bergstein | F03D 3/061 415/4.4 |
| 5,405,246 | A * | 4/1995 | Goldberg | F03D 80/40 416/DIG. 8 |
| 5,656,865 | A * | 8/1997 | Evans | F03D 7/06 290/55 |
| 6,428,275 | B1 * | 8/2002 | Jaakkola | F03D 3/005 416/DIG. 4 |
| 6,841,894 | B2 * | 1/2005 | Gomez Gomar | F03D 3/0409 290/55 |
| 7,400,057 | B2 * | 7/2008 | Sureshan | F03D 1/04 290/55 |
| 7,494,315 | B2 * | 2/2009 | Hart | F03D 3/005 415/176 |
| 7,896,609 | B2 * | 3/2011 | Mitchell | F03D 7/06 415/4.4 |
| 7,997,870 | B2 * | 8/2011 | Neumann | F03B 3/121 416/240 |
| 8,317,480 | B2 * | 11/2012 | Scarpelli | F03D 3/061 415/4.4 |
| 8,562,298 | B2 * | 10/2013 | Vallejo | F03D 3/061 416/197 A |
| 8,602,718 | B2 * | 12/2013 | Rokeby-Thomas | F03D 3/061 415/4.4 |
| 8,926,261 | B2 * | 1/2015 | Patrick | F03D 5/00 415/76 |
| 9,328,717 | B1 * | 5/2016 | Walker | F03D 3/061 |
| 2009/0028706 | A1 * | 1/2009 | Ioana | F03D 7/06 416/223 R |
| 2011/0027084 | A1 * | 2/2011 | Rekret | F03D 9/25 416/126 |
| 2012/0086279 | A1 | 4/2012 | Shen | |
| 2012/0098262 | A1 | 4/2012 | da Cunha | |
| 2012/0175882 | A1 | 7/2012 | Sterling et al. | |
| 2013/0280057 | A1 | 10/2013 | Patrick | |
| 2014/0015254 | A1 * | 1/2014 | Meyer | F03D 3/061 290/55 |
| 2016/0084222 | A1 | 3/2016 | Chio | |
| 2019/0257285 | A1 * | 8/2019 | Joutsiniemi | F03D 3/065 |

FOREIGN PATENT DOCUMENTS

| | | | | |
|---|---|---|---|---|
| DE | 102013004893 A1 | * | 9/2014 | ............ F03D 3/061 |
| EP | 2264309 A2 | | 12/2010 | |
| EP | 2662560 A2 | | 11/2013 | |
| ES | 1072304 U | | 6/2010 | |
| ES | 2418680 A2 | | 8/2013 | |
| ES | 2477115 A1 | | 7/2014 | |
| ES | 2620927 A1 | | 6/2017 | |
| KR | 20130132327 A | | 12/2013 | |
| WO | 2011017508 A2 | | 2/2011 | |
| WO | 2015004588 A1 | | 1/2015 | |
| WO | WO-2015004588 A1 | * | 1/2015 | ............ F03D 3/005 |

OTHER PUBLICATIONS

International Search Report and Written Opinion for Application No. PCT/CL2019/050071 dated Dec. 2, 2019 (12 pages).
Dampbell, "Introducing the O-Wind," Science Museum, <https://blog.sciencemuseum.org.uk/introducing-the-o-wind/>, dated Mar. 2, 2019.
European Patent Office Action for Application No. 19856840.4 dated Apr. 11, 2022 (10 pages).
Indian Patent Office Action for Application No. 202117014730 dated Sep. 12, 2022 (6 pages, including English Translations).

* cited by examiner

OMNIDIRECTIONAL GENERATOR APPARATUS

BACKGROUND OF THE INVENTION

The present invention, is an apparatus to generate energy, using omnidirectional fluxes.

Energy generating apparatus based on wind are generally classified according to the orientation of its axis that can be vertical (VAWTs) or horizontal (HAWTs).

Those having a horizontal axis are those that have most presence in the market of generation of great volumes of energy given their efficiency when faced with stable winds of high velocity. Their main limitation is that they need to be located in zones where the wind is stable in direction and intensity, given that they can't operate with low velocities and require braking systems for high velocities, apart from direction systems to face the wind perpendicular to its blades, which makes it not adaptable for zones with changing winds such as cities. Other inconveniences normally registered are a relatively high probability of failure due to the vibration to which they're subdued, the noise they generate and the environmental impact in visual terms and for the birdlife. Those having a vertical axis have the capacity of facing winds from any direction perpendicular to their axis, therefore they are commonly described as "omnidirectional". This description is wrong because said turbines can only function with winds perpendicular to its axis, namely, horizontal winds, but do not work with vertical or diagonal winds, therefore they are not optimum for situations wherein the winds can influence in vertical, horizontal or diagonal orientation, such as in the facades of the buildings in a city. The proposed apparatus has the capacity of facing winds from any direction, not only horizontal, but also diagonal and vertical, which allows to describe it as truly omnidirectional.

Some aerogenerators that have been published as "omnidirectional" are present in applications ES 1,072,304, ES 2,620,927, ES 2 477 115, and ES 2,418,680.

The generator apparatus based on wind can also be classified according to its functioning principle, capable of being by support or by drag. The better part of the apparatus of horizontal axis and some of vertical axis, such as Darrieus, function based on support. Others, such as Savonius for example, function by drag.

The proposed apparatus does not work based on drag or support, its functioning is based on the Venturi effect, which explains the difference in pressure of a fluid that travels through a conduit with a variating cross section. Therefore, having each channel a point of entrance greater than the exit point, the air that travels through speeds up reducing its outgoing pressure, which generates push from the entrance to the exit.

Other generators that are based on the Venturi effect use it mainly to accelerate air that faces a propeller, but not to produce push. Some examples are in publications US 2012/0175882, U.S. Pat. No. 4,508,973, EP 2264309A2 and US 2012/0098262 A1. Therefore, there is a need that has not been addressed of having an energy generator, based on a flux from any direction.

SUMMARY OF THE INVENTION

It is about an omnidirectional generator apparatus, capable of translating the push of a fluid from any direction in the vertical, horizontal or diagonal planes to rotational movement on a unique axis. This rotational movement can be translated to electric energy by known means.

This apparatus is especially useful in places where the direction and orientation of the fluids is changing, able to generate electricity with fluids in horizontal, vertical and/or diagonal orientation.

This apparatus does not need to be redirected to face the fluids from different directions, given that its geometry allows to function receiving fluxes from any of its faces.

The apparatus is conformed based on channels having entrances that are larger than the exits in variable proportions. Once travelled by a fluid, the difference in size between the entrance and the exit creates a difference in pressure that generates push from the entrance to the exit.

The channels can be straight or curved and of variable length. The entrances can be exposed to one of the faces of the apparatus, while the exits can lead to its interior and/or exterior.

The channels can be grouped forming the faces of a geometric body, these faces can be straight or curved and in the form of varied polygons. Each face can include one or more channels forming one or more layers of channels with internal and/or external outflow.

All the faces conformed by channels conform in conjunction a geometric body that rotates on a unique axis. To achieve this, each face is oriented so that its channels push the apparatus in a determined direction of rotation.

The apparatus is connected to an electricity generation system by means of a fixed axis that transfers the rotation of the body to the generator.

Said apparatus can be useful in several situations, such as for example to generate energy from wind in urban zones from fluxes of water under the waves of the sea.

BRIEF DESCRIPTION OF THE DRAWINGS

The invention will be best understood with reference to the attached figures, wherein.

DETAILED DESCRIPTION

Figure 1:
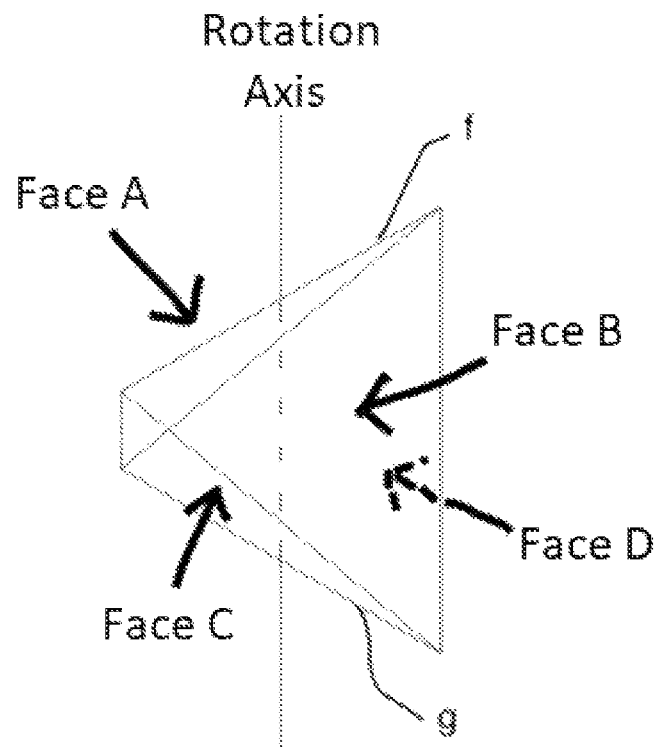
FIG. 1 is a schematic illustration, which shows a regular tetrahedron, which has faces identified with letters A, B, C and D; this figure can constitute the base geometry for a wind turbine as is described in the example. In the figure a unique rotation axis is also identified (k) and the vertices that intersect it (f) and (g).
Figure 2:
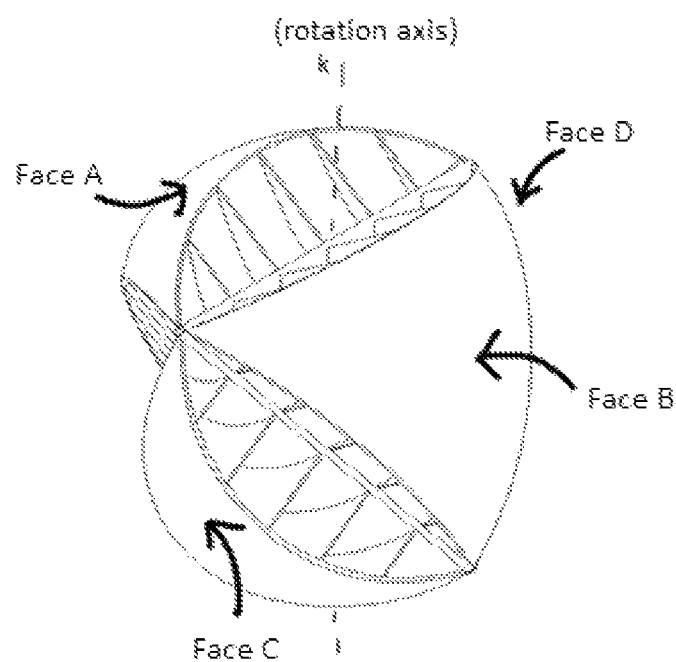
FIG. 2 is a schematic illustration, which shows the omnidirectional turbine described in the example; its triangular faces correspond to those identified in FIG. 1. The base geometry of this turbine is a regular tetrahedron. The unique axis of rotation (k) is also indicated.
Figure 3:
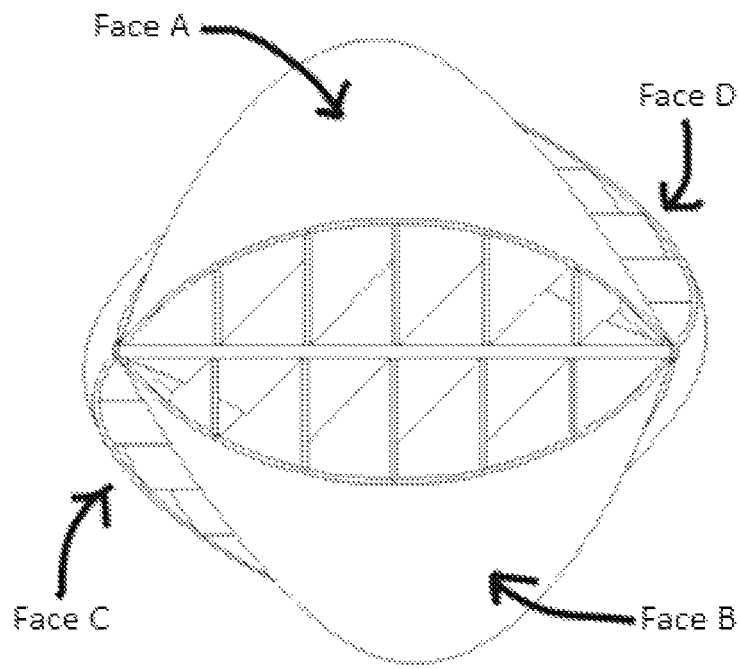
FIG. 3 is a schematic illustration, which shows the turbine described in the example from an axial view of its rotation axis. 4 faces; A, B, C and D, are identified.
Figure 4:
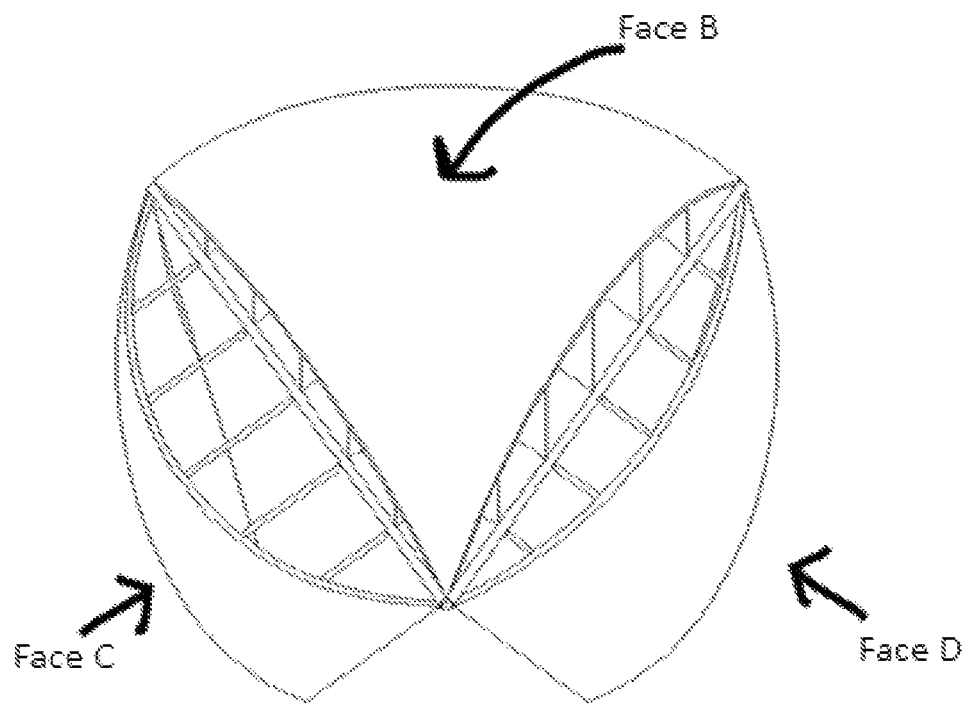
FIG. 4 is a schematic illustration, that shows the turbine described in the example from a perpendicular view of its rotation axis. 4 faces; A, B, C and D, are identified.
Figure 5:
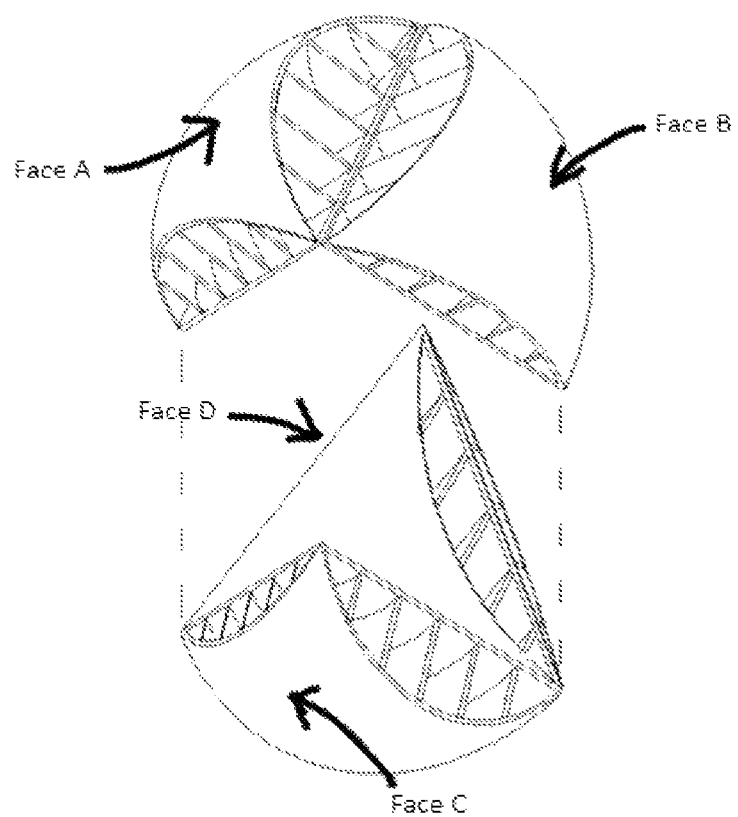
FIG. 5 is a schematic illustration, which shows the turbine described in the example from an axonometric view. Its 4 faces are presented distanced to facilitate comprehension. Faces A and B are equal and faced; in the same way, faces C and D are equal and faced. The difference between faces A-B and faces C-D is the orientation of its internal channels, as is explained in the latter figures.
Figure 6:
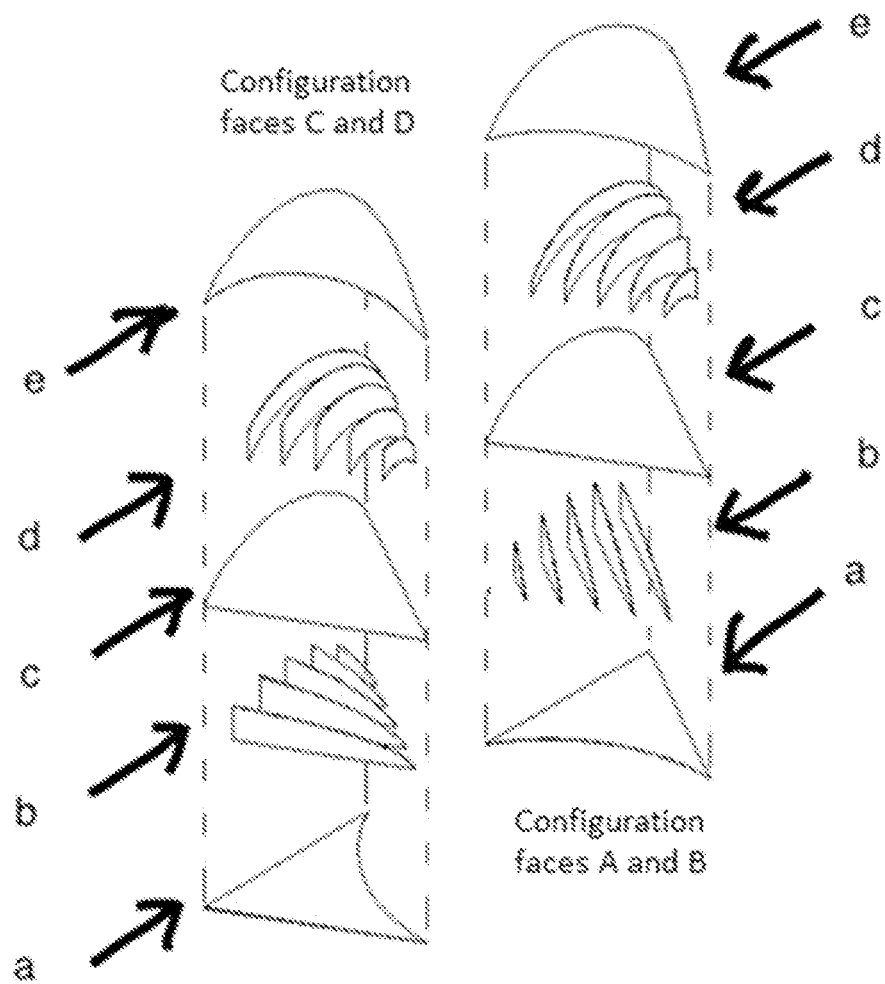
FIG. 6 is a schematic illustration, that shows a dismantling of faces A-B and C-D from an axonometric view. Each face is composed by 3 layers (a), (c) and (e) and 2 sets of separators (b) and (d). The difference in orientation of the separators can be distinguished, which are the ones that determine the orientation of the flux of air in the turbine described in the example. This difference allows to position itself in opposite positions in the turbine, each face translates the push of the wind to rotational movement always in the same direction.
Figure 7:
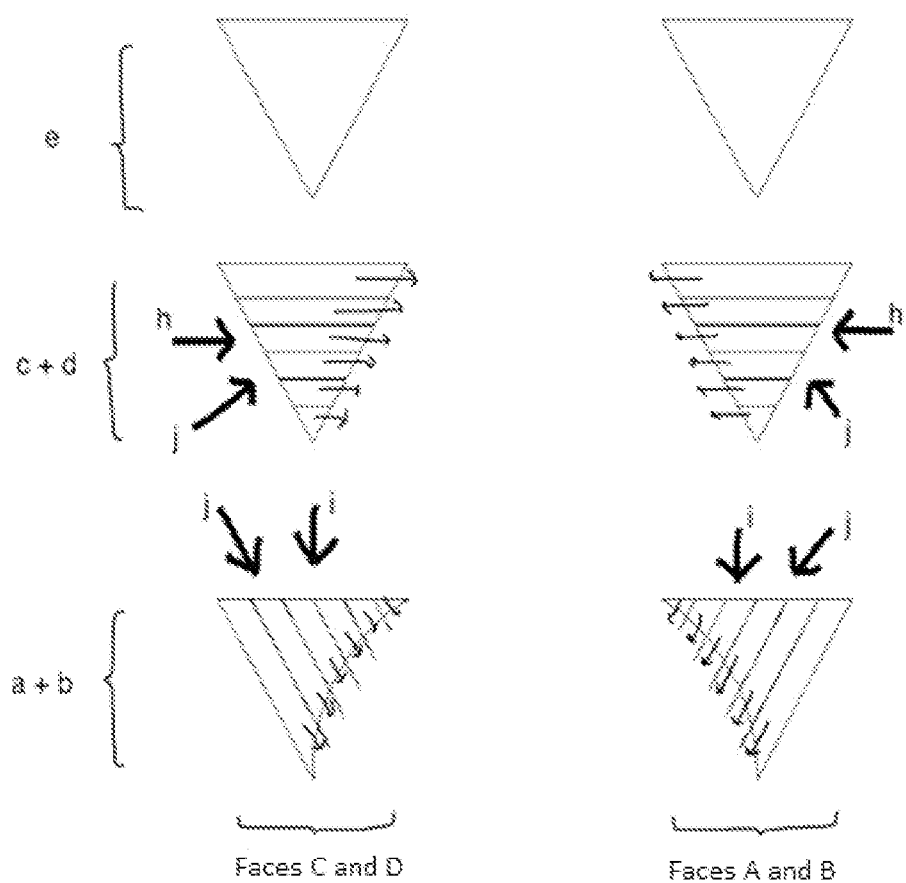
FIG. 7 is a schematic illustration, which shows the components identified in FIG. 6 grouped in a way that allows to visualize how wind is distributed and effects on each face.

The combination (a+b) illustrates the distribution of the channels having entrances that are found on the vertices that intersect the unique rotation axis (f) and (g), which therefore will be those that receive the axial winds to the rotation axis (k). In the example, these channels (b) can receive vertical (i) and diagonal (j) winds, and direct them internally diagonally, outflowing to internal exits through a cut in the internal face (a).

The combination (c+d) illustrates the distribution of the channels having entrances that are located on the vertices that do not intersect the rotation axis (k). In the example, these channels (d) can receive horizontal (h) and diagonal (j) winds, and direct them internally horizontally, outflowing to external exits.

Element (e) illustrates the exterior layer that closes all the channels (d). Its shape is given by the channels and does not correspond exactly to a segment of a sphere.

In this example, the entrances of all the channel sets (b) and (d) are given by a circular segment of the same size. Therefore, the air exits of all the channels (b) and (d) have an area corresponding to half of the entrances.

Application Example

An application of this technology can be an energy generator apparatus based on wind.

This apparatus can be conformed of 4 triangular faces (A, B, C and D) that form a regular tetrahedron. Each face can be conformed as well by 2 combinations of channels (a+b) and (c+d), with 6 channels with internal outflow (b) and 6 channels with external outflow (d). The channels with internal outflow (b) can be oriented in a different direction as those that outflow to the exterior (d).

The unique rotation axis of the apparatus (k) can be located in the centre of the opposing vertices of the tetrahedron (f) and (g). The channels having entrances that are located in the vertices that intersect in the rotation axis (b) can be oriented diagonally to generate a rotational movement based on winds that effect the apparatus in the axial direction (i) or diagonal to the axis (j). The channels having entrances that are located in the vertices that do not intersect the axis (d), can be oriented perpendicularly to the axis, to generate rotational movement based on winds that effect the apparatus perpendicularly (h) or diagonal to the axis (j).

Channels (b) and (d) can be separated by straight or curved walls and their upper and lower faces (a), (c) and (e) can be straight or curved. The channels can be varied in length. The entrances and exits of air of each face can conform a circular segment. The relation between the entrance and the exit can be given by the 2:1 ratio.

Said apparatus can be installed in the façade of a building with its axis in vertical, horizontal or diagonal position and, in any of these positions, can generate energy based on vertical, horizontal and diagonal winds existing in locations of this type.

The invention claimed is:

1. An omnidirectional generator apparatus,
    wherein the generator apparatus is configured to translate push of a fluid from any direction in the vertical, horizontal or diagonal planes to rotational movement on a unique axis,
    wherein the generator apparatus comprises:
    a plurality of channels;
    wherein an entrance to each channel is bigger than an exit of each channel, wherein once travelled by a fluid, a difference in size between the entrance and the exit creates a difference in pressure that generates push from the entrance to the exit;
    a plurality of faces that form a geometric body;
    wherein each face groups a subgroup of said plurality of channels, and wherein each face is oriented such that its channels push the apparatus in a determined rotational direction to rotate the geometric body;
    an electricity generation system;
    the unique axis;
    wherein the apparatus is connected to the electric generation system by means of the unique axis that transmits the rotation of the geometric body to the electricity generation system,
    wherein the entrances to the channels are located at edges of the omnidirectional generator apparatus,
    wherein channels of the plurality of channels that have entrances located at edges that intersect the unique axis are oriented diagonally to the unique axis, and channels of the plurality of channels that have entrances located at edges that do not intersect the unique axis are oriented perpendicularly to the unique axis.

2. The omnidirectional generator apparatus of claim 1, wherein exits of the channels lead to an interior of the omnidirectional generator apparatus.

3. The omnidirectional generator apparatus of claim 1, wherein exits of the channels lead to an exterior of the omnidirectional generator apparatus.

4. The omnidirectional generator apparatus of claim 1, wherein each face comprises a plurality of layers of the channels, wherein first channels of a first layer of the plurality of layers are oriented in a different direction to second channels of a second layer of the plurality of layers.

5. The omnidirectional generator apparatus of claim 1, wherein the channels vary in length.

6. The omnidirectional generator apparatus of claim 1, wherein the faces are polygonal.

7. The omnidirectional generator apparatus of claim 1, wherein the faces are curved.

8. The omnidirectional generator apparatus of claim 1, wherein the faces are straight.

9. The omnidirectional generator apparatus of claim 1, wherein the omnidirectional generator apparatus is installable in a façade of a building to generate energy from wind.

10. The omnidirectional generator apparatus of claim 1, wherein the exit of each channel is half the size of the entrance of each channel.

11. An omnidirectional generator apparatus,
    wherein the generator apparatus is configured to translate push of a fluid from any direction in the vertical, horizontal or diagonal planes to rotational movement on a unique axis,
    wherein the generator apparatus comprises:
    a plurality of channels;
    wherein an entrance to each channel is bigger than an exit of each channel, wherein once travelled by a fluid, a difference in size between the entrance and the exit creates a difference in pressure that generates push from the entrance to the exit;

a plurality of faces that form a geometric body;

wherein each face groups a subgroup of said plurality of channels, and wherein each face is oriented such that its channels push the apparatus in a determined rotational direction to rotate the geometric body;

an electricity generation system;

the unique axis;

wherein the apparatus is connected to the electric generation system by means of the unique axis that transmits the rotation of the geometric body to the electricity generation system, wherein the omnidirectional generator apparatus is a regular tetrahedron, comprising four triangular faces.

12. The omnidirectional generator apparatus of claim 11, wherein:

a first two of the four triangular faces are equal and faced, and a second two of the four triangular faces are equal and faced, and the channels of the first two of the four triangular faces are orientated differently to the channels of the second two of the four triangular faces.

13. The omnidirectional generator apparatus of claim 1, comprising a plurality of channels with internal outflow and a plurality of channels with external outflow, the channels with internal outflow being oriented in a different direction to the channels with external outflow.

* * * * *